United States Patent [19]

Geary

[11] 3,956,552

[45] May 11, 1976

[54] FLOCKED HEAT TRANSFER METHOD, APPARATUS AND ARTICLE

[75] Inventor: Joseph E. Geary, Rochester, N.Y.

[73] Assignee: Champion Products Inc., Rochester, N.Y.

[22] Filed: May 5, 1975

[21] Appl. No.: 574,749

[52] U.S. Cl. .................................. 428/88; 156/62.2; 156/285; 156/382; 427/148; 427/200; 428/90; 428/95; 428/914

[51] Int. Cl.² ........................ B05D 1/14; B05D 1/16; B32B 33/00

[58] Field of Search ................. 428/88, 90, 95, 914; 427/148, 180, 200; 156/62.2, 72, 285, 435, 382

[56] References Cited

UNITED STATES PATENTS

| | | | |
|---|---|---|---|
| 2,283,480 | 5/1942 | Wilkerson | 428/88 |
| 3,379,604 | 4/1968 | Weber | 428/90 |

*Primary Examiner*—Marion E. McCamish
*Attorney, Agent, or Firm*—Schovee & Boston

[57] ABSTRACT

A method and apparatus for making flocked heat transfers such that, when the resultant flocked heat transfer is applied to a receiving surface such as a garment, no objectionable thermoplastic deposit is left on the garment in the background areas of the flocked graphic design. The method comprises applying the flocked pattern onto a thermoplastic film carrier, placing an open mesh carrier cloth on top of the flocked pattern and film, and then applying a vacuum behind the cloth carrier while heating the sandwich structure to draw the heat softened thermoplastic film deep into the fibers of the carrier cloth of the heat transfer. The carrier cloth has a weave and absorbency so as to accept the thermoplastic material and retain it when the flocked heat transfer is finally applied to a receiving surface such as a garment, so that none of the film transfers to the garment in the background areas.

19 Claims, 11 Drawing Figures

FLOCKED HEAT TRANSFER METHOD, APPARATUS AND ARTICLE

BACKGROUND OF THE INVENTION

1. Field of the Invention

The present invention relates to decalcomania art, i.e., the art of transferring pictures and designs from specially prepared substrates to other surfaces, such as cloth garments. More specifically, this invention is directed to a method and apparatus for making improved heat transfers of flocking material, and to the flocked heat transfers made thereby.

2. Description of the Prior Art

A conventional method of making "heat transfers" of flocking material is disclosed in U.S. Pat. No. 3,379,604, issued to Webber, et al. A "heat transfer" as used in the decalcomania art, refers to a heat transferable design or decorative pattern, specifically formed on a paper or cloth substrate. Sometimes, it is referred to as a "dry transfer decalcomania". Flocking material, of course, is finely divided particles of fabric, such as wool, rayon, nylon, etc.

To make a flocked heat transfer by the process disclosed in the above-mentioned Webber et al patent, a heat-curable adhesive material is applied to the surface of a thermoplastic film in the form of a desired pattern. Thereafter, flocking material is selectively applied to the adhesive to form a flocked pattern. An open mesh carrier cloth is then placed over the flocked pattern and its thermoplastic support, and heat and pressure are applied simultaneously. The heat suffices to soften the thermoplastic film but not to permanently cure the flocked adhesive; the pressure aids in bonding the softened thermoplastic film to the cloth sheet. The resulting transfer is a sandwich structure which is 4 layers thick in the region of the flocked pattern, such layers being the cloth sheet, the flocking material, the uncured adhesive and the thermoplastic film. In the surrounding background areas, such sandwich structure consists only of the carrier cloth and the thermoplastic film. To transfer the flocked pattern from the carrier cloth to the fabric or garment receiving surface, such surfaces brought into contact with the flocked-bearing surface of the carrier cloth and heat and pressure are again applied. This time, however, the heat is sufficient to cure the adhesive and thereby permanently bond the flocked pattern to the receiving surface. The open mesh carrier cloth can then be peeled away, thereby exposing the flocked pattern.

In utilizing flocked heat transfers produced by the above process, it has been found that an undesired film of thermoplastic material is transferred to the ultimate fabric or garment receiving surface along with the flocked pattern. This undesired film appears in the background area of the flocked pattern and is, in fact, a portion of the thermoplastic film on which the flocked pattern was originally formed. In order to avoid the appearance of this objectionable film or deposit, it has been found necessary to accurately control, during the transfer operation, the temperature of the heat source the applied pressure, and the dwell time. If any of these parameters is excessive, the thermoplastic surface of the heat transfer will be softened to the extent that a substantial portion of the thermoplastic film will be re-transferred to the receiving surface. If any of the above parameters is below the level required for curing the flock adhesive, a poor transfer of the flocked pattern will result. The optimum temperature, pressure and dwell time for transferring the flocked pattern depends upon the curing temperature of the flocked adhesive, as well as on certain characteristics of the receiving surface. Inasmuch as many flocked heat transfers are utilized by individuals who not only have no knowledge of the optimum parameters for transfer, but also have no means for accurately controlling such parameters even if they were known, many heat transfers are used with less than optimum results.

SUMMARY OF THE INVENTION

A method (and apparatus) for making flocked heat transfers comprising the steps of: (a) applying a heat-curable adhesive to a thermoplastic film to form an adhesive pattern; (b) applying flocking material to the adhesive pattern to form a flocked pattern on the thermoplastic film; (c) thereafter placing an open mesh carrier cloth over the thermoplastic film to form a sandwich structure; (d) transferring the flocked pattern to the carrier cloth by heating the sandwich structure to soften the thermoplastic film; and (e) drawing by a source of negative (gauge) pressure (i.e. a partial vaccum) those background areas or regions of the thermoplastic film surrounding the flocked pattern, into the mesh of the carrier cloth, whereby such thermoplastic film in such background areas can not subsequently be re-transferred to the final receiving surface.

The flocked heat transfer article of this invention is the product produced by the above process and apparatus.

An object of the present invention, therefore, is to provide an improved flocked heat transfer which, when used to apply a flocked heat transfer to a garment or other receiving surface, leaves no objectionable thermoplastic deposit in the background areas of the flocked pattern.

Another object of the invention is to provide a method and apparatus for making such improved flocked heat transfer.

Another object of the invention is to provide a flocked heat transfer which, when applied to a receiving surface, is less sensitive to the temperature of the heat source, the pressure applied, and the dwell time.

Other objects and advantages of the invention will become apparent to those skilled in the art from the following detailed description of the preferred embodiment.

BRIEF DESCRIPTION OF THE DRAWINGS

The present invention will be more fully understood by reference to the following detailed description thereof, when read in conjunction with the attached drawings wherein like reference numerals refer to like elements, and wherein.

DETAILED DESCRIPTION OF THE PREFERRED EMBODIMENT

Figure 1:
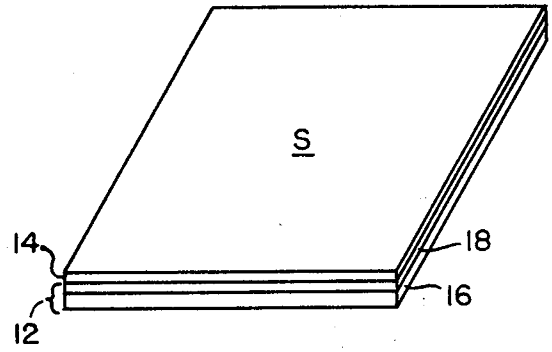
FIG. 1 is a perspective view of a sheet of release paper having a coating of thermoplastic material thereon.

Referring now to the drawings, the process of the present invention begins by preparing a suitable support on which a transferrable flocked heat transfer pattern can initially be formed. Such a support is illustrated in FIG. 1 and, when prepared, comprises a sheet 12 of release paper bearing a thin thermoplastic film 14. The sheet 12 of release paper is commercially available and generally comprises a relatively strong paper support 16, such as kraft paper, having a very thin coating 18 of a release agent, such as a silicone compound or wax, applied to one surface thereof. The purpose of the release agent, of course, is to inhibit other materials from becoming bonded to the paper upon being brought into contact therewith. The thermoplastic film 14, may comprise, for example, a commercially available vinyl material (e.g. Colonial No. 580–169 Vinyl, available from Colonial Printing Co. Inc., 180 E. Union Ave., East Rutherford, N.J. 07073) which is applied to the sheet 12 of release paper by a spray or knife coating process. Preferably, the thickness of the thermoplastic film 14 is between 1.0 and 1.5 mils. The thermoplastic film 14 can be selected from a wide range of materials; however, it must have the capability of being softened by the application of heat to the extent that it can penetrate the fibers or mesh of a carrier (e.g. a cloth) material to which it is vacuum drawn into contact upon being softened. Also, the thermoplastic film 14 must be compatible with the flock adhesive so that when the transfer is applied to a textile garment or fabric, good adhesion of the transfer is obtained.

Figure 2:
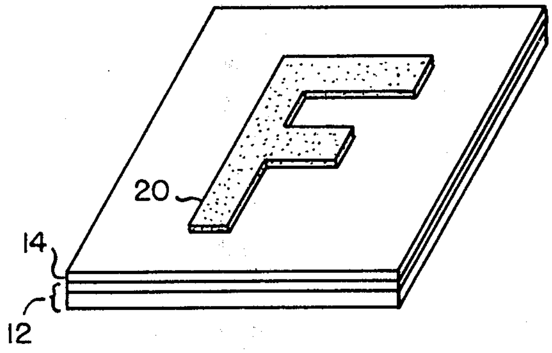
FIGS. 2–4 illustrate three steps of the process for making flocked heat transfers according to the invention.

As shown in FIG. 2, the second step of the process is to apply a flock adhesive 20 to the thermoplastic film 14 in a desired image or pattern configuration. As shown, the flock adhesive 20 has been applied to thermoplastic film 14 in such a manner as to form the letter "F". The flock adhesive can be applied in wet form by means of printing presses, hand painting, silk screen, or by any other well-known process for applying a tacky material to another material. The adhesive itself must be heat-curable; i.e. capable of becoming a solid flexible mass (such as a plastisol) by the application of heat. After flocking material is applied to the adhesive, it is preferable to semi-cure or gel the adhesive so as to convert it from a liquid to a "gelled" or semi-tac state. Curing of the adhesive can be effected by subjecting it to infrared or radio frequency radiation, or radiation from virtually any other energy source. The adhesive itself preferably comprises a plastisol formulation (a plastic material in paste form), but other heat-curable or air dry, cross linking adhesives, such as acrylic or phenol formulations, can also be used. It is important in semi-curing the adhesive prior to the application of the flocking material, that it not be over-cured; otherwise, it would be ineffective in bonding the flocked pattern to the ultimate fabric or garment receiving surface. Permanent curing of the adhesive is to occur only during final transfer of the flocked pattern.

Figure 3:
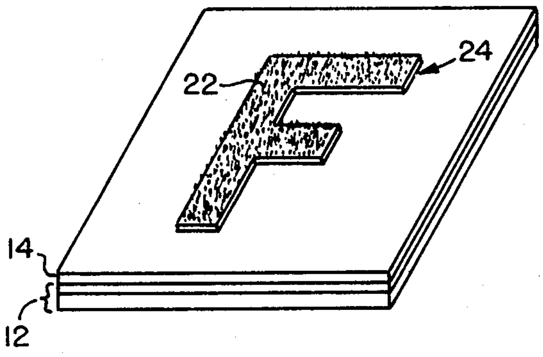

FIG. 3 shows the result of the third step of the process of the present invention, i.e. the step of applying flocking material 22 to the adhesive-bearing surface to produce a flocked pattern 24. Application of the flocking material can be effected by electrostatically creating an electric field between the adhesive-bearing thermoplastic film 14 and a flock dispenser. While an A.C. or a D.C. field may be applied, a D.C. field is preferred because it produces a better orientation of the flocking material. Electrostatic application of flocking material is wellknown in the prior art, and therefore no detailed description is necessary here. To remove flocking material from the background areas surrounding the desired flocked pattern, it is common to electrostatically neutralize both the flocking material and the thermoplastic film. Such neutralization can be accomplished by subjecting the thermoplastic film to a source of ions. Subsequently the neutralized flocking material is removed by a vacuum system comprising, for instance, a pair of oppositely rotating brushes surrounded by a housing to which a vacuum is applied.

Figure 4:
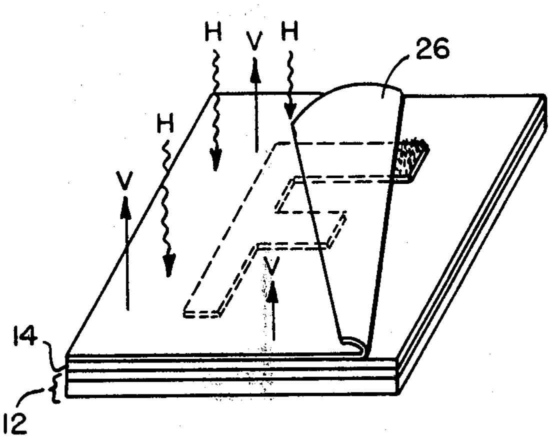
Figure 5:
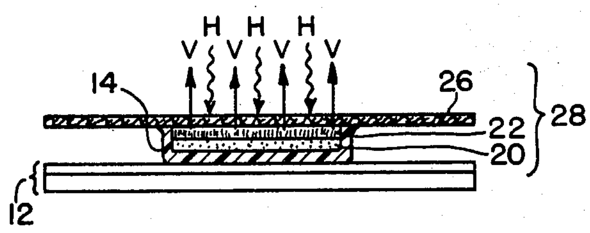
FIG. 5 is a cross-sectional view of FIG. 4.

FIGS. 4 and 5 illustrate the next step of the process. After the flocked pattern 24 has been applied to the thermoplastic film 14 and the excess flocking material removed, the thermoplastic film 14 and the flocked pattern 24 is covered with an open mesh carrier cloth 26, such as organdy. It is this open mesh carrier cloth 26 which ultimately receives the flocked pattern 24 from the sheet 12 of release paper and thereby becomes the heat transfer. After the open mesh carrier cloth 26 is properly positioned on the flocked pattern 24, a vacuum "V" is applied through the open mesh carrier cloth 26 to draw the thermoplastic film 14 into intimate contact therewith such that said film 14 penetrates into the open mesh of said cloth 26. Simultaneously with the application of the vaccum "V", the entire sandwich-like structure of FIG. 4 is heated (schematically illustrated by the reference character "H") to a temperature sufficient to cause the thermoplastic film 14 to liquify. Due to the vacuum "V", the liquified thermoplastic film is drawn deep into and within the fibers of the open mesh carrier cloth 26. It is this step which prevents re-transfer of the thermoplastic film during transfer of the flocked pattern to the ultimate receiving surface. After the thermoplastic film has been sufficiently drawn into the open mesh material and the sandwich-like structure is allowed to cool, the sheet 12 of release paper is peeled from the carrier cloth 26 or, optionally, left in place until such time as the heat transfer 27 is to be utilized. It is important that, during the heat/vacuum applying step, the temperature of the structure is not raised to a level sufficient to permanently cure the flock adhesive. It is noted that FIGS. 4 and 5 are diagrammatic in that, as shown in FIG. 7 during the preferred process the sandwich structure is inverted and the vacuum is pulled down through the carrier cloth 26.

In FIG. 5, the flocked heat transfer is shown in cross-section during the heat and vacuum applying step of FIG. 4. As shown, during this step the thermoplastic film 14 is drawn into the fibers of carrier cloth 26, and only a very thin film remains on the flocked adhesive 20. The remaining thermoplastic film serves to secure the flocked pattern and its adhesive 20 to the carrier sheet 26 after the sheet 12 of release paper has been removed, leaving a heat transfer 27.

Figure 6:
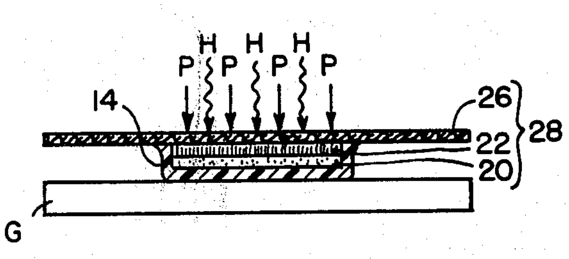
FIG. 6 is a cross-sectional view showing the flocked heat transfer of FIG. 5 being transferred by heat to a receiving surface.

In FIG. 6, the flocked heat transfer 27 produced by the above process is shown, in cross-section, being applied to the surface of a garment G. Transfer of the flocked pattern is achieved by bringing the garment G into contact with the heat transfer 27 and by applying pressure P and heat H to the resulting sandwich structure. The heat must be sufficient to raise the temperature of the flocked adhesive to its flow and curing temperature so as to enable the adhesive to become bonded to the fibers of the garment G. Upon being cooled, the carrier cloth 26 is removed, leaving the flocked pattern 24 facing outwardly from the surface of the garment G. It should be noted that no transfer of the thermoplastic film 14 in the background areas of the flocked pattern 24 occurs because during the heat/-vacuum step of FIGS. 4 and 5 in the process for making the heat transfer 27, the thermoplastic film 14 in such areas has become impregnated into the carrier cloth 26 and does not transfer to the garment G.

Figure 7:
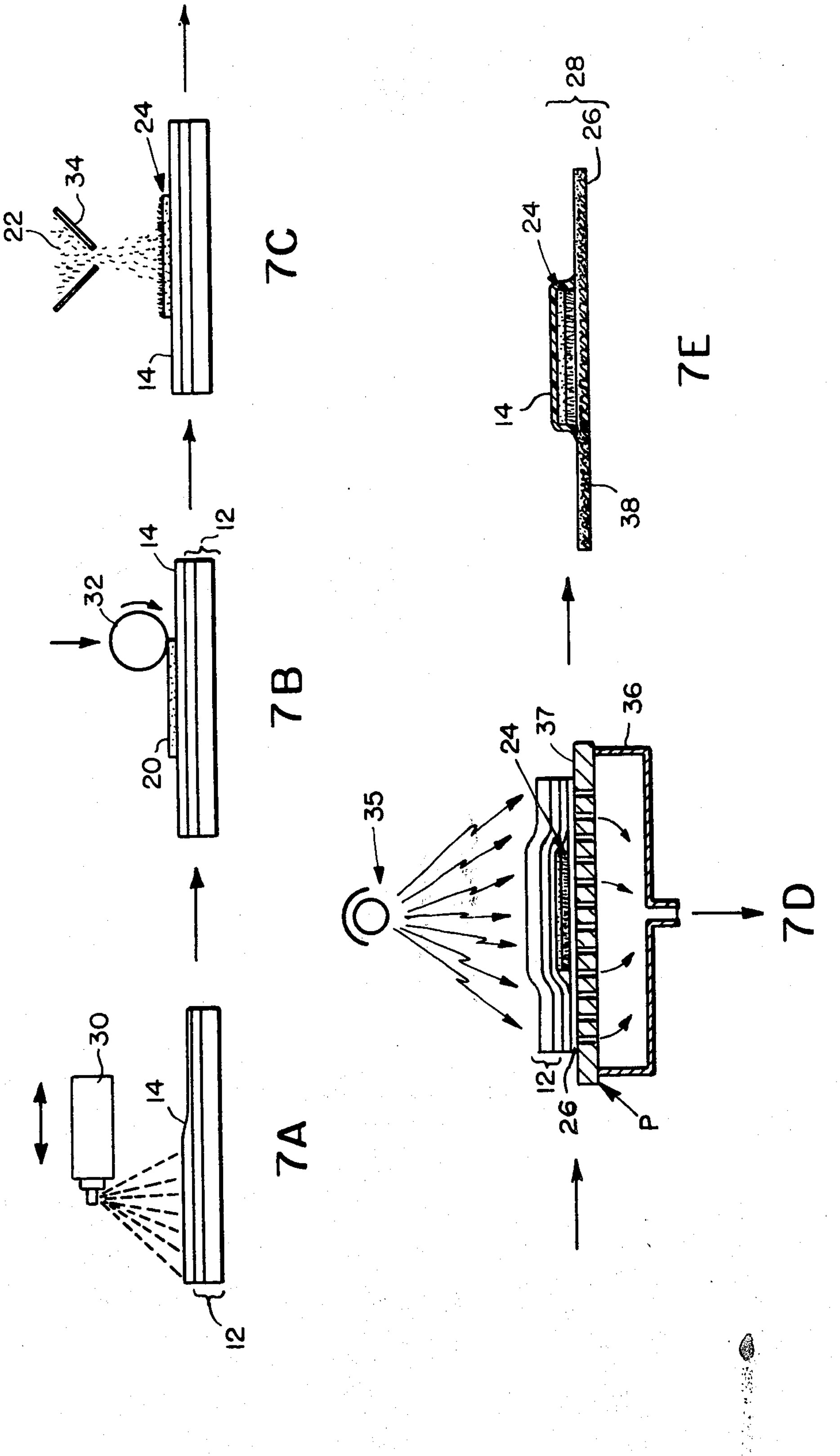
FIG. 7 is a diagrammatic, schematic flow diagram of the apparatus and process of the present invention.

FIG. 7 is a diagrammatic, schematic illustration of the method and apparatus of the present invention. FIG. 7(A) shows spray means 30 for applying the thermoplastic film 14 to the release paper sheet 12. FIG. 7(B) shows a printing roller 32 for applying the flock adhesive 20 to the film 14. FIG. 7(C) shows a flock applicator 34 for applying flocking material 22 to the flock adhesive 20. FIG. 7(D) shows the carrier cloth 26 in place covering the flock pattern 24 on the thermoplastic film 14, and this sandwich structure inverted with the cloth carrier placed on top of a perforated plate 37 having a means 36 behind the plate 37 for drawing a vacuum behind the carrier cloth 26, while an infrared light source 35 applies heat to the sandwich. The film 14 is drawn into the cloth 26 as illustrated by the dots 38 in FIG. 7(E). FIG. 7(E) shows the flocked heat transfer 28 consisting of a carrier cloth 26, a flocked pattern 24 and a thin layer of thermoplastic film 14 over the flocked pattern 24. There is substantially no film 14 on the cloth 26 on the background areas; it is impregnated at 38 into the cloth 26.

While the invention has been described with particular reference to the preferred embodiment, it should be apparent that numerous changes and modifications are possible without departing from the scope of the invention, as defined by the claims presented below. For example, it is not essential that the vacuum and heating steps of FIGS. 4 and 5 be simultaneous. Further, the vacuum need not be pulled over the entire surface of the cloth 26 at one time. The sandwich structure of FIG. 7(D) need not be inverted; the vacuum can be drawn upwardly. The use of the sheet 12 of release paper is not essential. Any desired partial vacuum such as a negative pressure of −15 to −3 psig can be used depending on the thickness of the thermoplastic film and the type of carrier used. The vacuum need not only impregnate the cloth, it can also pull the thermoplastic material through the cloth rather than only impregnate it. Other open mesh carriers than cloth can be used, such as non-woven preferably absorbent materials such as textile and paper products. If the material is non-absorbent, then some thermoplastic film could exist after the vacuum drawing step on top of each element surrounding the openings in the mesh and could transfer to the receiving garment.

I claim:

1. A method for making a flocked heat transfer comprising the steps of:

a. applying a layer of heat-curable adhesive in a pattern on a thermoplastic film to form an adhesive pattern thereon;
b. applying flocking material to said adhesive pattern to form a flocked pattern;
c. placing an open mesh carrier over said thermoplastic film and flocked pattern to form a sandwich structure;
d. transferring said flocked pattern to said carrier by heating said sandwich structure to liquify said thermoplastic film and vacuum drawing said liquified thermoplastic film, in the background areas of said flocked pattern, into the mesh of said carrier to impregnate said carrier with said thermoplastic film such that substantially no thermoplastic film is left on the surface of said carrier in the background areas of said flocked pattern that can subsequently re-transfer to a receiving surface when the flocked heat transfer is applied to a final receiving surface by the application of heat.

2. The method according to claim 1 wherein said carrier is an absorbent cloth.

3. The method according to claim 2 including the preliminary step of applying a thermoplastic film on a sheet of release paper prior to said step of applying an adhesive pattern on said thermoplastic film.

4. The method according to claim 3 including the final step of removing said release paper from said carrier cloth to provide a flocked heat transfer that consists of said carrier cloth having said flocked pattern, a thin thermoplastic film covering said flocked pattern, and said cloth being impregnated with said film in the background areas of said flocked pattern.

5. The method according to claim 4 including placing said flocked heat transfer in contact with a final receiving surface with said flocked pattern in contact with the receiving surface, applying heat and pressure thereto to transfer said flocked pattern to said receiving surface, and then removing said carrier cloth and all thermoplastic film in the background areas from said receiving surface.

6. The method according to claim 2 wherein said vacuum drawing step comprises inverting said sandwich structure and placing said cloth on the top surface of a perforated plate and drawing a partial vacuum on the bottom surface of said plate.

7. The method according to claim 6 wherein said heating step comprises placing a radiation heat source above said sandwich structure and energizing said heat source to heat said sandwich structure by radiation.

8. The method according to claim 7 wherein said energizing step is simultaneous with said vacuum drawing step.

9. The method according to claim 2 wherein said heating step is done simultaneously with said vacuum drawing step.

10. In the method of making a flocked heat transfer comprising applying a heat curable adhesive in a pattern to a surface of a thermoplastic film to form an adhesive pattern, applying flocking material to said adhesive pattern to form a flocked pattern, placing an open mesh carrier over the flocked pattern and thermoplastic film to form a sandwich structure and applying heat thereto to transfer the flocked pattern to the carrier, the improvement comprising vacuum drawing the liquified thermoplastic film, in the background areas of the flocked pattern, into the mesh of the carrier to impregnate the carrier with the film such that when the flocked heat transfer is subsequently re-transferred to a final receiving surface substantially no thermoplastic film will transfer to the final receiving surface in the background areas.

11. The method according to claim 10 wherein said carrier is an absorbent cloth.

12. The method according to claim 11 wherein said vacuum drawing step comprises inverting said sandwich structure and placing said cloth on the top surface of a perforated plate and drawing a partial vacuum on the bottom surface of said plate.

13. The method according to claim 12 wherein said heating step comprises placing a radiation heat source above said sandwich structure and energizing said heat source to heat said sandwich structure by radiation.

14. The method according to claim 13 wherein said heating step is done simultaneously with said vacuum drawing step.

15. The method according to claim 11 wherein said heating step is done simultaneously with said vacuum drawing step.

16. In an apparatus for forming a flocked heat transfer including means for applying a heat curable adhesive to a thermoplastic film in a desired pattern to form an adhesive pattern, means for applying flocking material to the adhesive pattern to form a flocked pattern, and means for applying heat to a sandwich structure comprising an open mesh carrier placed over the flocked pattern on the thermoplastic film, the improvement comprising means for drawing a partial vacuum behind the open mesh carrier for drawing the thermoplastic film in the background areas of said flocked pattern into the open mesh of the carrier cloth.

17. A flocked heat transfer comprising an open mesh carrier, a flocked pattern on one surface of said carrier, and a layer of thermoplastic film overlaying only the flocked pattern and being vacuum impregnated into the open mesh carrier in the background areas of the pattern.

18. The article of claim 16 wherein said carrier is an absorbent cloth.

19. The article according to claim 18 wherein no substantial amount of thermoplastic film exists on the surface of the carrier cloth such that substantially no thermoplastic film is re-transferred in the background areas when the flocked heat transfer is applied to a final receiving surface.

* * * * *